US005660434A

United States Patent [19]
Nicksic

[11] Patent Number: 5,660,434
[45] Date of Patent: Aug. 26, 1997

[54] BABY CAR SEAT AIR BAG PROTECTOR

[76] Inventor: Edward E. Nicksic, 1318 W. Oregon, Phoenix, Ariz. 85013

[21] Appl. No.: 781,423

[22] Filed: Jan. 10, 1997

[51] Int. Cl.$^6$ .................................................. B60N 2/28
[52] U.S. Cl. ........................... 297/216.11; 297/256.15; 297/487
[58] Field of Search ................. 297/216.11, 256.15, 297/487, 488

[56] References Cited

U.S. PATENT DOCUMENTS

| | | | |
|---|---|---|---|
| 3,146,026 | 8/1964 | Berlin | 297/487 X |
| 3,722,951 | 3/1973 | Ezquerra | 297/487 X |
| 5,395,154 | 3/1995 | Wang | 297/487 X |
| 5,468,047 | 11/1995 | Goor et al. | 297/184.13 X |
| 5,556,162 | 9/1996 | Raffini | 297/216.11 X |

*Primary Examiner*—Peter R. Brown
*Attorney, Agent, or Firm*—Cahill, Sutton & Thomas P.L.C.

[57] ABSTRACT

A baby car seat air bag protector includes a baby car seat for securing an infant in a reclined position upon a conventional car seat. The air bag protector includes a lateral bar that extends laterally above and around the chest of the infant. The opposing side ends of the lateral bar are releasably secured to opposing sides of the baby car seat. An upper bar extends perpendicular to the lateral bar around the infant's head. The lower end of the upper bar is secured to the central region of the lateral bar. The upper end of the upper bar is releasably secured to the upper edge of the back portion of the baby car seat. The side ends of the lateral bar, and the upper end of the upper bar, include clamps for releasably grasping edge portions of the baby car seat. The upper bar may be pivotally connected to the lateral bar to allow the upper bar to be displaced when placing a child into, or removing a child from, the baby car seat. The upper bar may be detached from the lateral bar to make the unit more compact for storage and packaging. Likewise, the lateral bar may be formed of two detachable halves.

20 Claims, 3 Drawing Sheets

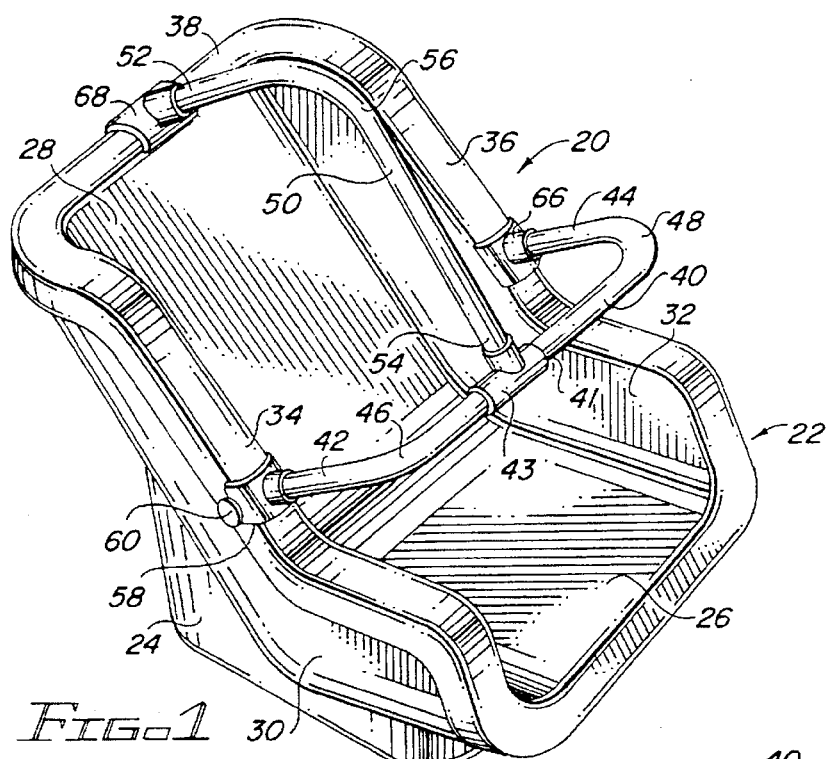
FIG-1
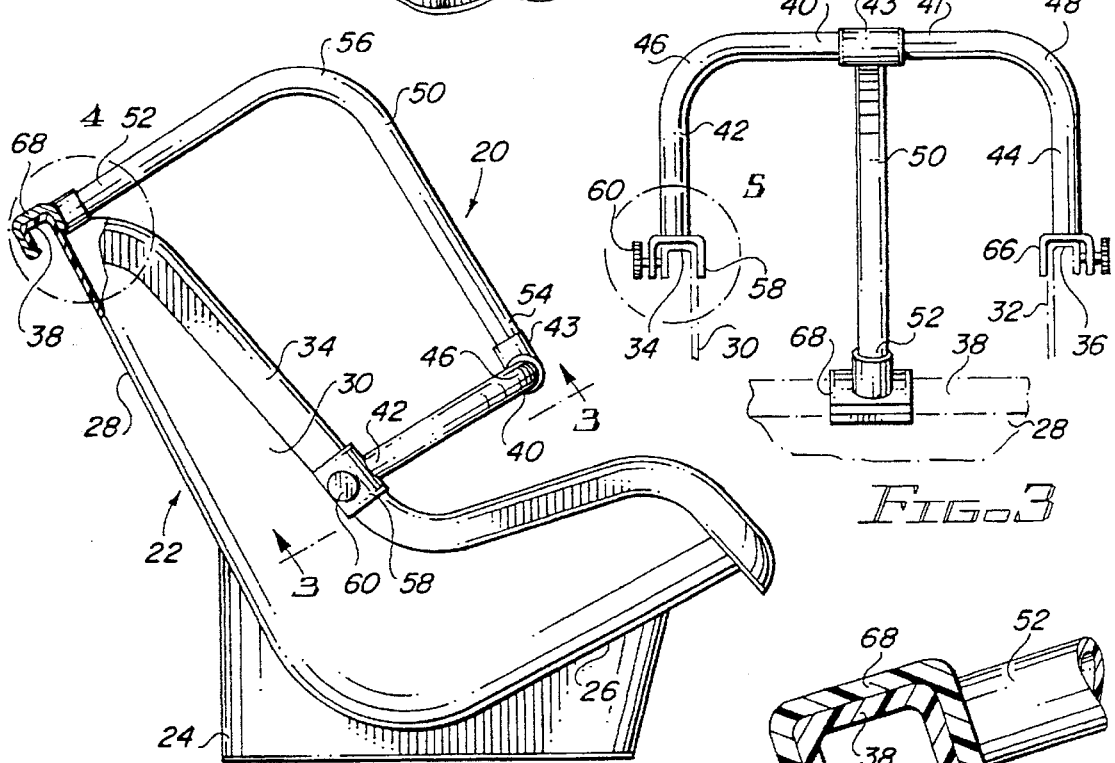
FIG-2
FIG-3
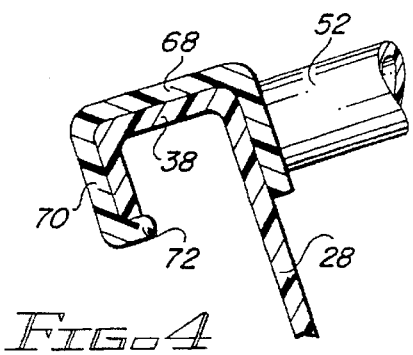
FIG-4

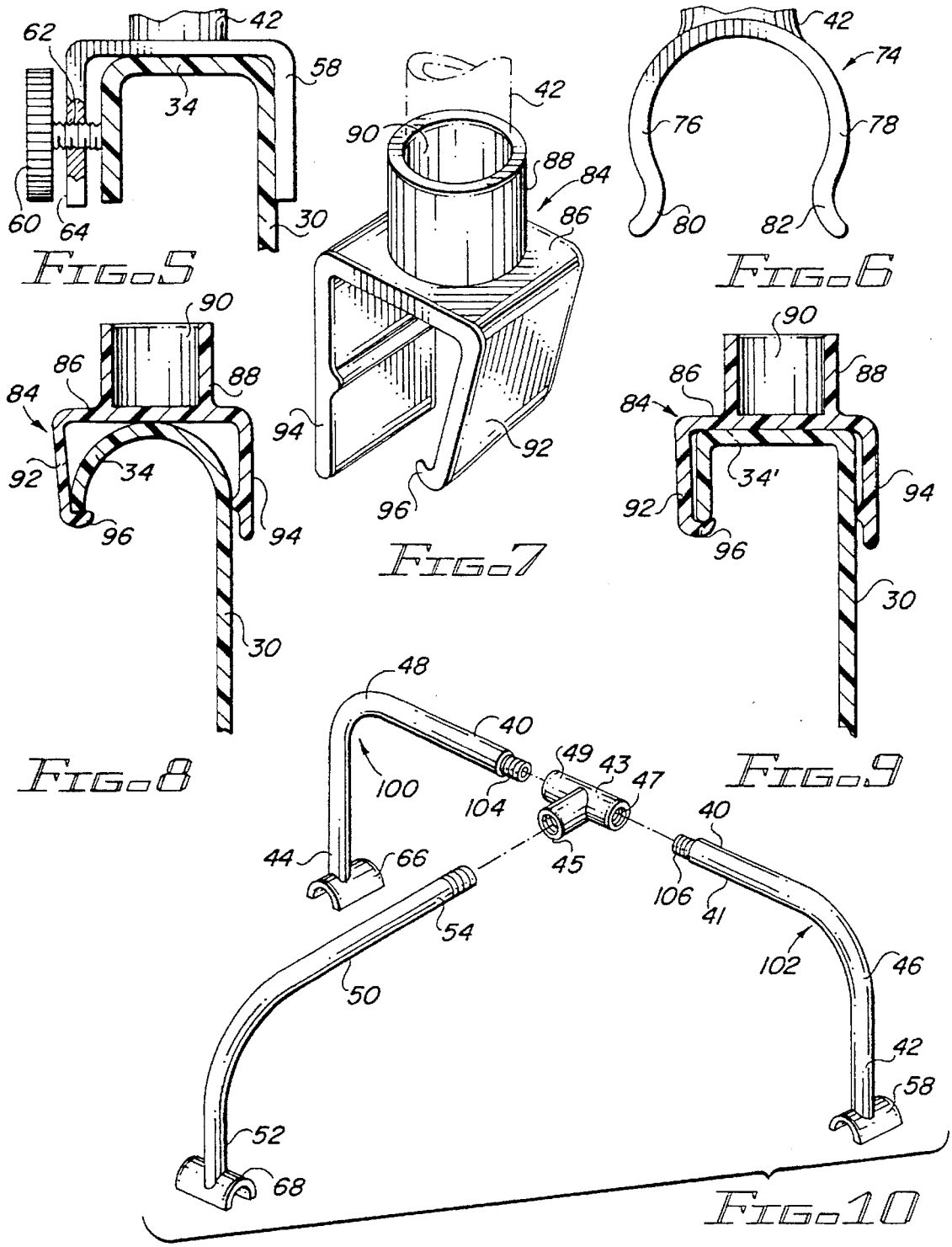

5,660,434

BABY CAR SEAT AIR BAG PROTECTOR

BACKGROUND OF THE INVENTION

1. Field of the Invention

The present invention relates generally to baby car seats in which infants are supported when traveling in automobiles, and more particularly, to a baby car seat which includes apparatus for protecting an infant against the explosive forces of an air bag during a collision.

2. Description of the Relevant Art

Since their introduction into commercial vehicles, air bags have saved hundreds of lives which might otherwise have been lost as a result of high-speed front impact collisions. Initially, such air bags were limited to driver-side air bags. Later, passenger side air bags were introduced in some models to provide the same advantages to front seat passengers. Passenger side air bags are being federally mandated for cars in 1997 and for light trucks in 1998.

Another safety device which has typically reduced injuries in motor vehicle accidents is the baby car seat which allows an infant or small child that is too small to wear a conventional lap belt and shoulder harness to be safely supported upon a conventional passenger seat. While statistics show that infants and children are safer riding in the rear seat of a vehicle, this is not always possible. In some cases, the driver of the vehicle must also be able to see or reach the child, particularly if a child is ill. In other cases, the vehicle does not include a rear seat, as is true for many pickups and sports cars. In such cases, the baby car seat usually is placed on the passenger side of the front seat.

Unfortunately, the combination of passenger side air bags and baby car seats secured to the front seat has proven to be fatal in some instances. Air bags can deploy at speeds of up to 200 miles per hour; while such air bags can safely cushion a full-sized adult, they can cause injury, and even death to an infant or small child. An infant or small child sitting in a forward-facing safety seat is positioned such that his or her head and neck are actually closer to the point of the instrument panel from which the air bag is deployed than for a full-sized adult. When an infant is riding in such a forward-facing car baby seat, an air bag expanding at such speed can snap the neck of an infant or small child positioned close to the instrument panel. Moreover, if a baby car seat is positioned so that the infant faces rearward, the explosive force of the air bag can drive the upper end of the baby car seat rearward, forcing the baby's head at rapid speed into contact with the headrest or between the seats.

As a result of such problems, the National Highway Traffic Safety Administration has been considering regulations which require vehicle manufacturers to provide cut-out switches to deactivate air bags, a move that Ford Motor Company adopted for its 1996 Ranger pickup. Of course, the owner of the vehicle may forget to disable the passenger side air bag when an infant is present, or may forget to reactivate the passenger side air bag when an adult is occupying the front passenger seat. The NHTSA is also studying so-called "smart air bags" having complex sensors to control the speed at which such air bags are deployed; however, vehicle manufacturers may yet be years away from actually providing such devices on a commercial basis.

In view of the foregoing problems, it is an object of the present invention to provide an apparatus for reducing the risk of injury caused by a deployed passenger-side air bag to an infant or small child positioned upon the front passenger-side seat of a vehicle.

Another object of the present invention is to provide such an apparatus which may incorporate as a component thereof any of a large number of currently-available baby car seats.

Still another object of the present invention is to provide such an apparatus which is relatively easy and inexpensive to manufacture.

A further object of the present invention is to provide such an apparatus which does not significantly complicate the process of placing the infant or small child into, or removing the infant or small child from, a conventional baby car seat.

A yet further object of the present invention is to provide such an apparatus which can be disassembled into a relatively compact state when not in use for ease in packaging and storage.

These and other objects of the present invention will become more apparent to those of ordinary skill in the art as the description of the present invention proceeds.

SUMMARY OF THE INVENTION

Briefly described, and in accordance with the preferred embodiments thereof the present invention is an apparatus for protecting an infant from injury during deployment of a vehicle air bag, including a conventional baby car seat of the type used to secure an infant in a reclined position upon a conventional car seat. Such baby car seats include a base for resting upon the conventional car seat, along with seat, back and side portions for supporting and cradling the infant. The apparatus also includes a lateral bar having opposing first and second side ends and adapted to extend generally laterally above and across the chest of the infant. The opposing side ends of the lateral bar are secured to corresponding opposing said side portions of the baby car seat. The apparatus further includes an upper bar extending generally perpendicular to the lateral bar above and around the head of the infant. The lower end of the upper bar is coupled to the central region of the lateral bar, and the upper end of said upper bar is secured to an upper edge of the back portion of the baby car seat.

In the preferred embodiment of the present invention, the upper end of the upper bar is releasably secured to the upper edge of the back portion of the baby car seat for allowing said upper bar to be displaced during those times when the infant is being placed into and removed from said baby car seat. Likewise, the first and second side ends of the lateral bar are also preferably releasably secured to the opposing side portions of the baby car seat for allowing the lateral bar to be displaced when the infant is being placed into and removed from said baby car seat.

To further facilitate displacement of the upper bar when the infant is being placed into and removed from said baby car seat, the lower end of the upper bar can be releasably coupled to the central region of the lateral bar for allowing the upper bar to be removed from the baby car seat during such instances. Alternatively, the lower end of the upper bar can be pivotally coupled to the central region of the lateral bar for allowing the upper bar to be swung away from the infant during those times when the infant is being placed into and removed from said baby car seat. Such pivotal coupling can also be advantageous for adapting the lateral bar and upper bar to baby car seats made by different manufacturers.

In the preferred embodiment of the present invention, the upper end of the upper bar has a bend formed therein for extending above and around the top of the infant's head. Likewise, the first and second side ends of the lateral bar may also have a bend formed therein for allowing the lateral bar to extend above and around the infant's chest, thereby spacing the central region of the lateral bar away from the infant's chest.

The releasable attachment formed between the baby car seat and the upper end of the upper bar may be provided by a clamp secured to the upper end of the upper bar for releasably securing the upper end of the upper bar to the upper edge of the back portion of the baby car seat. Where the back portion of the baby car seat includes an aperture formed near the upper edge thereof to aid in carrying the baby car seat, a portion of the clamp preferably extends through such aperture. The clamp may be generally U-shaped, wherein the parallel arms of the U-shaped clamp extend around the upper edge of the baby car seat.

Similarly, the releasable attachment formed between the baby car seat side portions and the side ends of the lateral bar may be provided by a clamp secured each of the side ends of the lateral bar for releasably securing the respective side ends of the lateral bar to the opposing side portions of the baby car seat. Typically, the opposing side portions of the baby car seat each include a generally-rounded edge, and each of the clamps may be generally U-shaped to extend about one of such generally-rounded edges.

As mentioned above, one preferred embodiment of the present invention allows for disengagement of the lower end of the upper bar from the central region of the lateral bar. In this regard, the lower end of the upper bar is tubular in configuration, and the central region of the lateral bar includes a socket having an internal bore adapted to receive the lower tubular end of the upper bar. The internal bore of the socket, and the lower tubular end of the upper bar, may both be smooth for allowing the lower tubular end of the upper bar to slidingly engage the socket to form a releasable coupling therebetween. Alternatively, the internal bore of the socket, and the lower tubular end of the upper bar may both be formed with mating threads to provide a threaded, but releasable, coupling between the lower tubular end of the upper bar and the central region of the lateral bar.

To further reduce the size of the apparatus for purposes of packaging and/or storage, the lateral bar may also be provided as first and second half-bar portions that may be decoupled from each other. In this embodiment of the present invention, the lateral bar includes a first half-bar portion, a second half-bar portion, and a central coupler. The inner ends of the first and second half-bar portions are secured to the coupler near the central region of the lateral bar, and the outer ends of the first and second half-bar portions form the first and second side ends of the composite lateral bar. If desired, the inner end of at least one of the first and second half-bar portions is tubular, and the coupler includes a socket including an internal bore adapted to receive such tubular inner end. The internal bore of the socket and the tubular inner end can both be made smooth for allowing such tubular inner end to slidingly engage the socket to form a releasable coupling therebetween. Alternatively, the internal bore of the socket and the tubular inner end of the corresponding half-bar portion may both be formed with mating threads to provide a threaded, but releasable, coupling between the inner ends of the first and second half-bar portions.

BRIEF DESCRIPTION OF THE DRAWINGS

FIG. 1 is a perspective view of an apparatus for protecting an infant from injury during deployment of a vehicle air bag in accordance with a first preferred embodiment of the present invention.

FIG. 2 is a side view of the apparatus shown in FIG. 1.

FIG. 3 is a sectional view of the lateral bar and upper bar of the apparatus shown in FIG. 2 viewed from the plane indicated by lines 3—3 within FIG. 2.

FIG. 4 is an enlarged sectional detail view of the clamp secured to the upper end of the upper bar as indicated in dashed circle 4 of FIG. 2.

FIG. 5 is an enlarged sectional detail view of the thumb-screw clamp secured to one side end of the lateral bar as indicated in dashed circle 5 within FIG. 3.

FIG. 6 is a side view of an alternate style of clamp which may be used to secure the lateral bar and/or upper bar to the baby car seat.

FIG. 7 is a perspective view of yet another alternate style of clamp which may be used to secure the ends of the lateral bar and upper bar to edges of the baby car seat.

FIGS. 8 and 9 are sectional views showing the clamp of FIG. 7 engaged over a rounded edge and a squared edge, respectively, of a baby car seat.

FIG. 10 is an exploded perspective view of the lateral bar and upper bar of the apparatus demonstrating how such components may be disassembled and reassembled.

DETAILED DESCRIPTION OF THE PREFERRED EMBODIMENTS

Figure 11:
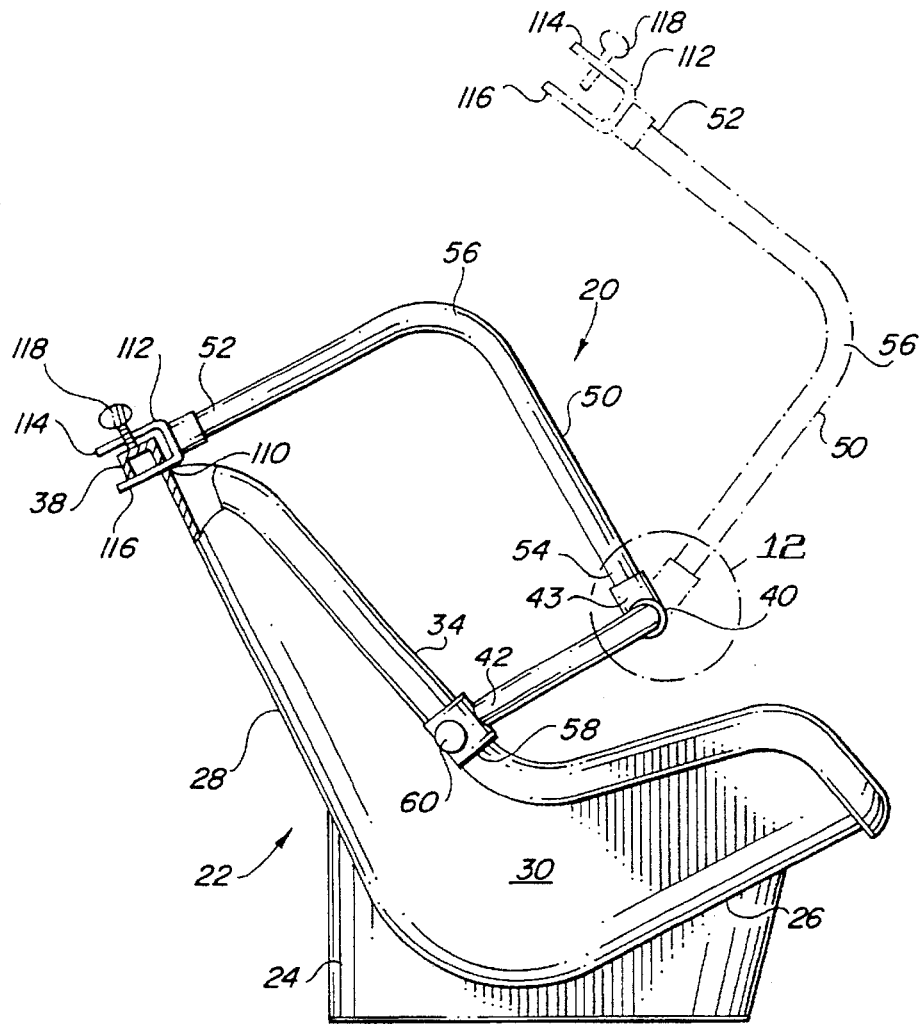
FIG. 11 is a side view of an alternate embodiment of the apparatus shown in FIG. 1 wherein a pivotal coupling secures the lower end of the upper bar to the central region of the lateral bar.

In FIGS. 1 and 2, an apparatus for protecting an infant from injury during deployment of a vehicle air bag, constructed in accordance with a first embodiment of the present invention, is designated generally by reference numeral 20. Apparatus 20 includes a baby car seat 22 of the general type conventionally used for securing an infant in a reclined position upon a passenger seat of a vehicle. Baby car seat 22 includes base portion 24 for resting upon the conventional passenger seat. Supported by base portion 24 are seat portion 26, a backrest portion 28, and opposing side portions 30 and 32 for supporting and cradling the infant within baby car seat 22. Base 24, seat 26, back 28, and sides 30 and 32 are preferably formed as an integral plastic molded structure.

As shown in FIGS. 1 and 2, side portions 30 and 32 extend generally along opposing sides of both seat portion 26 and back portion 28. For greater comfort and strength, the outer edges 34 and 36 of side portions 30 and 32, respectively, are rounded, or rolled. Likewise, the upper edge 38 of backrest 28 is rolled over for added strength and comfort. In addition, a padded insert (not shown) may be provided for cushioning an infant placed in baby car seat 22.

Apparatus 20 also includes a lateral bar 40 having a central region 41 disposed between opposing side ends 42 and 44, respectively, and extending generally laterally above, and somewhat forward of, the chest of the infant (not shown). As shown in FIGS. 1 and 2, side end 42 includes a bend 46 extending through approximately a ninety-degree angle. Side end 44 includes a similar bend 48. Bends 46 and 48 allow lateral bar 40 to extend above and around the infant's chest and for spacing central region 41 of lateral bar 40 away from the infant's chest. As indicated in FIGS. 1 and 2, side ends 42 and 44 of lateral bar 40 are secured to outer edges 34 and 36, respectively, of side portions 30 and 32 of baby car seat 22. Additional details concerning the manner by which side ends 42 and 44 are secured to baby car seat 22 are provided below.

In addition to lateral bar 40, apparatus 20 also includes an upper bar 50 having an upper end 52 and an opposing lower end 54. As shown in FIGS. 1 and 2, upper bar 50 preferably includes a bend 56 forming an angle of approximately ninety degrees for allowing upper bar 50 to extend above and around the top of the infant's head. As shown in FIGS. 1-3, upper bar 50 extends generally perpendicular to lateral bar 40, and extends above and in front of the head of the infant (not shown). Lower end 54 of upper bar 50 is coupled to central region 41 of lateral bar 40; upper end 52 of upper bar 50 is secured to upper edge 38 of backrest 28 of baby car seat 22. Both lateral bar 40 and upper bar 50 may be formed of any high strength plastic, such as polyvinyl chloride (PVC) tubing. Additional details concerning the manner by which lower end 54 of upper bar 50 is secured to lateral bar 40, and concerning the manner by which upper end 52 of upper bar 50 is secured to the upper edge 38 of baby car seat 20, are also provided below.

In the preferred embodiment of the present invention, the side ends 42 and 44 of lateral bar 40 are releasably secured to opposing side portions 30 and 32 of baby car seat 22; likewise, upper end 52 of upper bar 50 is releasably secured to upper edge 38 of backrest 28. In this manner, lateral bar 40 and upper bar 50 can be removed entirely from baby car seat 22 during those times when the infant is being placed into, or removed from, the vehicle.

The releasable attachment of side end 42 of lateral bar 40 to side edge 34 of side portion 30 is achieved, within the embodiment shown in FIGS. 1-3 and 5, by a clamp 58 having a generally U-shaped configuration for extending about rolled side edge 34 of baby car seat 22. As indicated in FIG. 5, a thumbscrew 60 having a threaded shaft engages a threaded aperture 62 formed in arm 64 of clamp 58 for releasably tightening clamp 58 to rolled side edge 34. A clamp 66 of identical construction is provided for side end 44 of lateral bar 40 to releasably attach side end 44 to rolled side edge 36.

In the embodiment of the present invention illustrated in FIGS. 1-4, the upper end 52 of upper bar 50 is releasably secured to the upper edge 38 of backrest 28 by a further clamp 68. As shown in FIG. 4, clamp 68 may be generally U-shaped to extend around and grasp upper edge 38 of backrest 28. As is also shown in FIG. 4, the arm 70 of clamp 68 that extends behind upper edge 38 of backrest 28 may include a small hook or detente 72 to prevent upper bar 50 from becoming inadvertently dislodged from upper edge 38 during use.

Those skilled in the art will appreciate that the apparatus described thus far, when used to transport an infant in a forward-facing direction upon a front passenger seat, greatly lessens the likelihood that the infant will become injured by reason of a rapidly-inflating passenger side air bag. The main brunt of the force exerted by the air bag (not shown) is borne by lateral bar 40 and upper bar 50 which transmit such force directly into the baby car seat 22, and into the passenger side seat. While the air bag is still effective to cushion baby car seat 22 (and the infant secured therein) in a serious impact, the infant's head, neck, shoulders and upper torso are kept sufficiently far away from the rapidly expanding air bag to avoid injury.

In FIG. 6, an alternate form of a generally U-shaped clamp is designated by reference numeral 74. Clamp 74 is illustrated as being secured to the side end 42 of lateral bar 40 and includes a pair of spaced-apart arms 76 and 78 adapted to extend around the rolled edge 34 of side portion 34 for releasably securing side end 42 of lateral bar 40 to baby car seat 22. The lower portions 80 and 82, respectively, of arms 76 and 78 curve inwardly and back outwardly to facilitate placement over rolled edge 34. Clamp 74 may be formed of metal or molded plastic, and preferably includes some degree of flexibility to allow for some displacement of the arms 76 and 78 away from each other.

FIGS. 7-9 illustrate another form of generally U-shaped clamp designated generally by reference numeral 84. Clamp 84 includes a central base portion 86 from which a circular socket 88 extends. The side end 42 of lateral bar 40 is shown in dashed outline in FIG. 7 and is indicated as being in the form of a cylindrical tube. Side end 42 extends into the internal bore 90 of socket 88. Opposing arm portions 92 and 94 extend from base portion 86 for releasably grasping an edge portion of baby car seat 22. For example, in FIG. 8, clamp 84 is shown after being extended over a rounded side edge 34 of baby car seat 22. As shown in FIGS. 7-9, arm 92 of clamp 84 may include a small inwardly directed retaining hook 96 for extending over side edge 34 to minimize the likelihood that clamp 84 might become detached from side edge 34 during use. In FIG. 9, clamp 84 is shown after being extended around a squared-off side edge 34'; in this case, clamp 84 functions substantially the same way as was described for the rounded side edge 34 shown in FIG. 8.

In order to make the apparatus more compact, for purposes of packaging and/or storage, upper arm 50 can be designed to be detachable from lateral arm 40. Referring to FIGS. 1, 2 and 10, lateral bar 40 may include a T-shaped coupler 43 secured to the central region 41 of lateral bar 40. Coupler 43 includes a socket 45 adapted to releasably engage lower end 54 of upper arm 50 for allowing upper bar 50 to be removed from lateral bar 40. The lower end 54 of upper bar 50 is preferably tubular, and socket 45 includes an internal bore adapted to receive the lower tubular end 54 of upper bar 50.

In one embodiment of the present invention, the internal bore of socket 45 is smooth, and the lower tubular end 54 of upper bar 50 is also smooth for allowing lower end 54 to slidingly engage socket 45 to form a releasable coupling therebetween. In the alternate embodiment specifically illustrated in FIG. 10, the internal bore of socket 45 is threaded, and the lower tubular end 54 of upper bar 50 is also threaded for threadedly engaging socket 45 to form a releasable coupling between lower tubular end 54 of upper bar 50 and central region 41 of lateral bar 40. Both such embodiments allow the apparatus to be configured in a more compact form for storage or packaging. In addition, when in use, it may also be possible to remove only upper bar 50 from the apparatus during those times when the infant is being placed into and removed from said baby car seat.

Likewise, to render the apparatus even more compact, lateral bar 40 may be formed of two half-bar portions 100 and 102, wherein coupler 43 allows at least one of such half-bar portions to be detached therefrom. Each of half-bar portions 100 and 102 includes an inner end 104 and 106, respectively. Inner ends 104 and 106 of half-bar portions 100 and 102 are each secured to coupler 43 near the central region 41 of lateral bar 40. As shown in FIG. 10, the opposing outer ends of half-bar portions 100 and 102 form side ends 44 and 42, respectively, of lateral bar 40. As further indicated in FIG. 10, at least one of inner ends 104 and 106 is tubular, and coupler 43 includes a socket 47 having an internal bore adapted to receive tubular inner end 106. In the particular embodiment shown in FIG. 10, coupler 43 includes an additional socket 49 for receiving the inner tubular end 104 of half-bar portion 100. The internal bore of sockets 47 and 49 may be smooth, and tubular inner ends 106 and 104 may also be smooth for slidingly engaging such sockets to form a releasable coupling between inner ends 104 and 106 and coupler 43. Alternately, as shown in FIG. 10, the internal bores of sockets 49 and 47 may be threaded, and tubular inner ends 104 and 106 of half-bar portions 100 and 102 may also be threaded to form a releasable coupling between inner ends 104 and 106 of half-bar portions 100 and 102.

Figure 12:
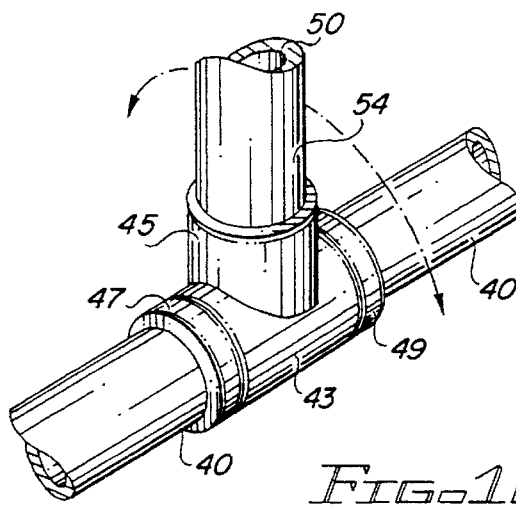
FIG. 12 is an enlarged partial perspective view of the pivotal coupling between the lower end of the upper bar and the central region of the lateral bar.

FIGS. 11 and 12 illustrate an alternate embodiment of the apparatus shown in FIGS. 1 and 2. Those components shown in FIGS. 11 and 12 which correspond to those already described above in regard to FIGS. 1 and 2 are designated by like reference numerals. The primary feature which distinguishes the embodiment of FIGS. 11 and 12 from the embodiments already described above is that lower end 54 of upper bar 50 is pivotally coupled to central region 41 of lateral bar 40 for allowing upper bar 50 to be displaced to the position shown in dashed outline in FIG. 11 during those times when the infant is either being placed into or removed from baby car seat 22. As indicated in FIG. 13, coupler 43 is rotatably secured about central region 41 of lateral bar 40 for allowing upper bar to be swung forward and backward.

FIG. 11 also illustrates an alternate embodiment of a clamp used to releasably secure upper end 52 of upper bar 50 to the uppermost end of backrest 28. Some conventional baby car seats include an aperture 110 formed in the backrest portion 28 near the upper edge 38 thereof to aid in carrying baby car seat 22 to or from a vehicle. Aperture 110 can be used to help secure the upper end of upper bar 50 to upper edge 38 of backrest 28. In this regard, clamp 112 shown in FIG. 11 is generally U-shaped and includes a pair of spaced apart arms 114 and 116. Arm 114 is adapted to extend over rolled upper edge 38. Arm 116 extends through aperture 110 and below rolled upper edge 38. A fastening thumbscrew 118 extends through arm 114 and can be tightened against upper edge 38 to releasably secure the upper end 52 of upper arm 50 thereto.

Those skilled in the art will now appreciate that the present invention provides an apparatus that serves to reduce the risk of injury caused by a deployed passenger-side air bag to an infant or small child positioned upon the front passenger-side seat of a vehicle. The described apparatus can be used in conjunction with many of the currently-available baby car seats, and is relatively easy and inexpensive to manufacture. The apparatus can be easily removed from and/or displaced from the baby car seat so as to avoid interference with the process of placing the child into, or removing the child from, the baby car seat. Moreover, the described apparatus can be provided in a form that can be disassembled into a relatively compact state when not in use for ease in packaging and storage.

While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

I claim:

1. An apparatus for protecting an infant from injury during deployment of a vehicle air bag, said apparatus comprising in combination:

a. a baby car seat for securing an infant in a reclined position upon a conventional car seat, said baby car seat including a base portion for resting upon the conventional car seat and further including seat, back and side portions for supporting the infant therein, said side portions extending generally along opposing sides of said seat and back portions, and said back portion including an upper edge located at the uppermost end of said back portion;

b. a lateral bar having opposing first and second side ends for extending generally laterally above the chest of the infant, said lateral bar including a central region, the first side end of said lateral bar being secured to one of said side portions of the baby car seat, and the second side end of said lateral bar being secured to the other of said side portions of the baby car seat; and c. an upper bar having opposing upper and lower ends for extending generally perpendicular to said lateral bar above the head of the infant, the lower end of said upper bar being coupled to the central region of said lateral bar, and the upper end of said upper bar being secured to the upper edge of said back portion of said baby car seat.

2. The apparatus recited by claim 1 wherein the upper end of said upper bar is releasably secured to the upper edge of said back portion of said baby car seat for allowing said upper bar to be displaced during those times when the infant is being placed into and removed from said baby car seat.

3. The apparatus recited by claim 2 wherein the lower end of said upper bar is releasably coupled to the central region of said lateral bar for allowing said upper bar to be removed from said baby car seat during those times when the infant is being placed into and removed from said baby car seat.

4. The apparatus recited by claim 2 wherein the lower end of said upper bar is pivotally coupled to the central region of said lateral bar for allowing said upper bar to be displaced during those times when the infant is being placed into and removed from said baby car seat.

5. The apparatus recited by claim 1 wherein the upper end of said upper bar includes a bend for extending above and around the top of the infant's head.

6. The apparatus recited by claim 1 wherein the upper end of said upper bar includes a clamp for releasably securing the upper end of said upper bar to the upper edge of said back portion of said baby car seat for allowing said upper bar to be displaced during those times when the infant is being placed into and removed from said baby car seat.

7. The apparatus recited by claim 6 wherein said back portion of said baby car seat includes an aperture formed near the upper edge thereof to aid in carrying said baby car seat, and wherein at least a portion of said clamp extends through said aperture.

8. The apparatus recited by claim 6 wherein said clamp is generally U-shaped, and wherein said U-shaped clamp extends around the upper edge of said baby car seat.

9. The apparatus recited by claim 1 wherein at least the lower end of said upper bar is tubular, and wherein the central region of said lateral bar includes a socket including an internal bore adapted to receive the lower tubular end of said upper bar.

10. The apparatus recited by claim 9 wherein the internal bore of said socket is smooth, and wherein the lower tubular end of said upper bar slidingly engages said socket to form a releasable coupling between the lower tubular end of said upper bar and the central region of said lateral bar.

11. The apparatus recited by claim 9 wherein the internal bore of said socket is threaded, and wherein the lower tubular end of said upper bar is also threaded for threadedly engaging said socket to form a releasable coupling between the lower tubular end of said upper bar and the central region of said lateral bar.

12. The apparatus recited by claim 1 wherein the first and second side ends of said lateral bar are releasably secured to said opposing side portions of said baby car seat for allowing said lateral bar to be displaced during those times when the infant is being placed into and removed from said baby car seat.

13. The apparatus recited by claim 1 wherein the first and second side ends of said lateral bar each include a bend for extending above and around the infant's chest and for spacing the central region of said lateral bar away from the infant's chest.

14. The apparatus recited by claim 1 wherein the first and second side ends of said lateral bar each include a clamp for releasably securing the respective side ends of said lateral bar to said opposing side portions of said baby car seat for allowing said lateral bar to be displaced during those times when the infant is being placed into and removed from said baby car seat.

15. The apparatus recited by claim 14 wherein said opposing side portions of said baby car seat each include a generally-rounded edge, and wherein each said clamp extends about a generally-rounded edge of one of said first and second side portions of said baby car seat.

16. The apparatus recited by claim 15 wherein each said clamp is generally U-shaped.

17. The apparatus recited by claim 1 wherein said lateral bar includes a first half-bar portion, a second half-bar portion, and a coupler, each of said first and second half-bar portions including an inner end and an outer end, the inner end of each of said first and second half-bar portions being secured to said coupler near the central region of said lateral bar, and the outer ends of said of said first and second half-bar portions forming the first and second side ends of said lateral bar.

18. The apparatus recited by claim 17 wherein the inner end of at least one of said first and second half-bar portions is tubular, and wherein said coupler includes a socket including an internal bore adapted to receive said at least one tubular inner end.

19. The apparatus recited by claim 18 wherein the internal bore of said socket is smooth, and wherein the at least one tubular inner end slidingly engages said socket to form a releasable coupling between the inner ends of said first and second half-bar portions.

20. The apparatus recited by claim 18 wherein the internal bore of said socket is threaded, and wherein the at least one tubular inner end is also threaded for threadedly engaging said socket to form a releasable coupling between the inner ends of said first and second half-bar portions.

* * * * *